Sept. 13, 1927.
J. S. ORR
1,642,459
SPROCKET CHAIN
Filed Jan. 3, 1927
2 Sheets-Sheet 1
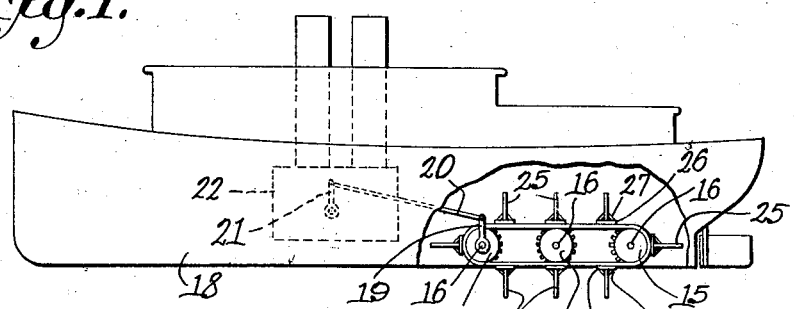
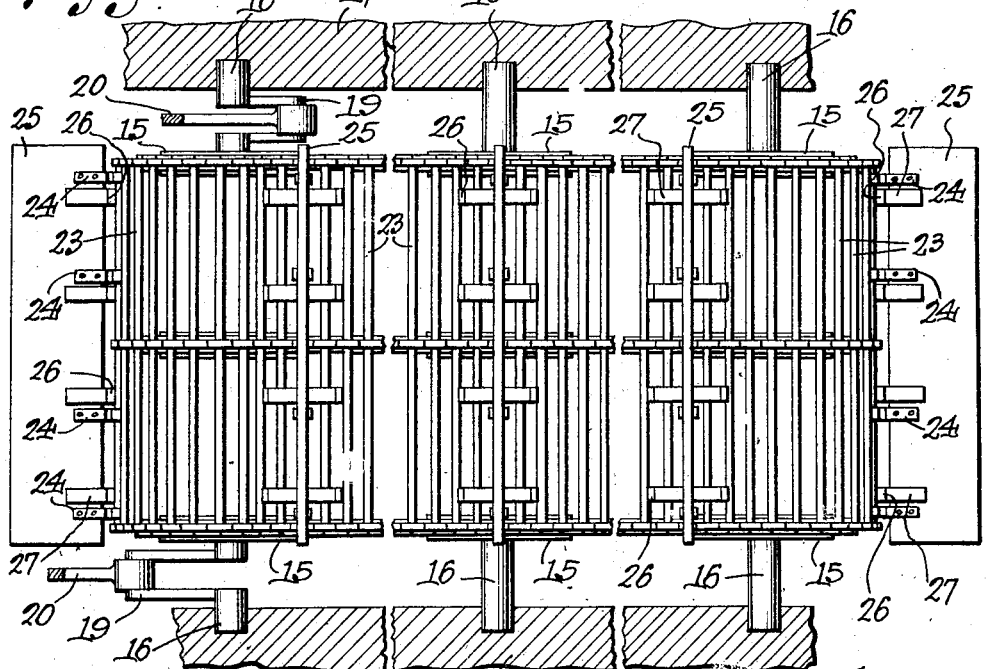
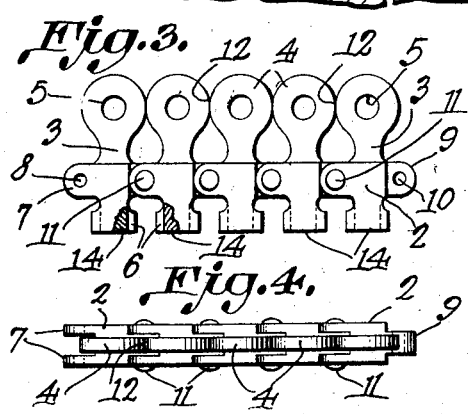
John S. Orr, Inventor
By C. A. Snow & Co.
Attorneys Sept. 13, 1927.  
J. S. ORR  
1,642,459  
SPROCKET CHAIN  
Filed Jan. 3, 1927  
2 Sheets-Sheet 2
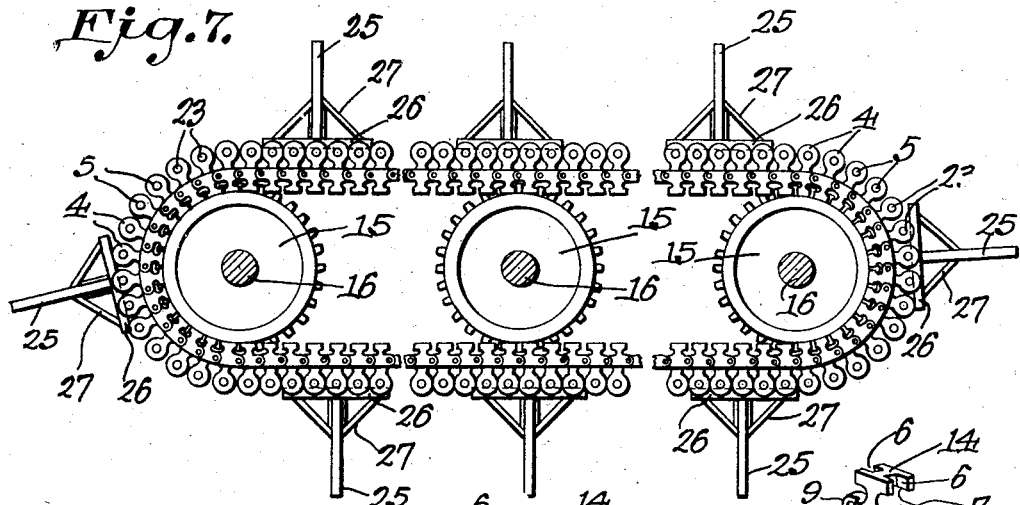
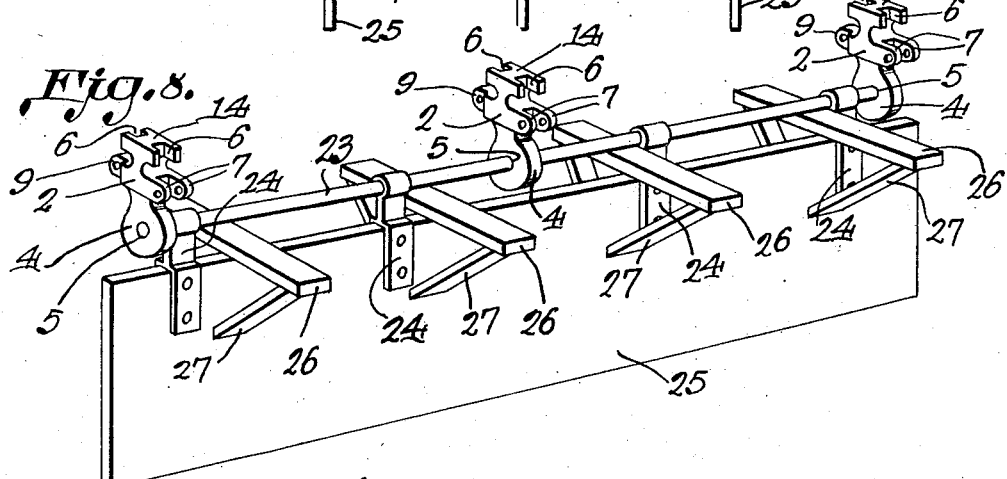
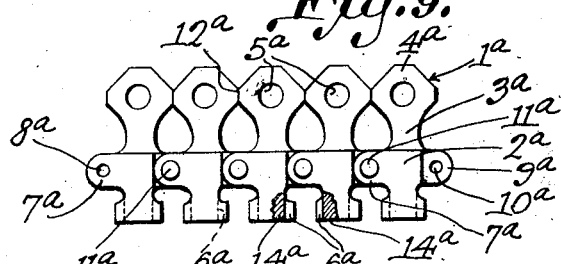
John S. Orr Inventor
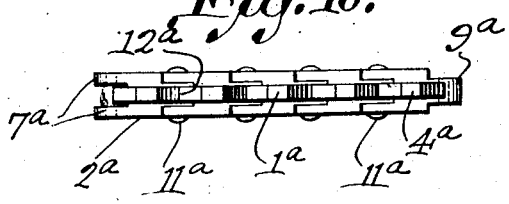
Attorneys Patented Sept. 13, 1927.

1,642,459

UNITED STATES PATENT OFFICE.

JOHN STEVENS ORR, OF AUGUSTA, KENTUCKY.

SPROCKET CHAIN.

Application filed January 3, 1927. Serial No. 158,653.

This invention aims to provide a sprocket chain so constructed that it will neither sag nor wear the sprocket wheels like an ordinary sprocket chain, the chain being steady in operation under conditions which render other chains unsatisfactory.

In the drawings:—Figure 1 shows in side elevation one application of the invention, the same being embodied in a mechanism for marine propulsion; Figure 2 is a top plan showing several chains assembled to form the structure delineated in Figure 1; Figure 3 is a side view showing several of the connected links; Figure 4 is a plan of the links depicted in Figure 3; Figure 5 is an elevation of one of the links; Figure 6 is a perspective view of the link; Figure 7 is an elevation showing a driving mechanism made up of devices constructed in accordance with the invention; Figure 8 is a perspective view showing one of the paddles and attendant parts; Figure 9 is a side view showing a modified form of chain; Figure 10 is a plan of the chain depicted in Figure 9; Figure 11 is an elevation showing one of the links used in making the chain of Figures 9 and 10.

Referring to Figures 5 and 6, there is shown a link 1 comprising a body 2 provided at one end with a reduced neck 3 merging into an enlarged disk-like head 4 having an opening 5, there being oppositely disposed recesses 6 in that end of the body 2 which is remote from the head 4, the recesses 6 opening through the end of the body 2, longitudinally thereof. The body 2 is provided at one side, and at a point intermediate its ends, with spaced transverse ears 7 having openings 8. On its opposite side, the body 2 of the link 1 has a lug 9 provided with an opening 10. The lug 9 of one link is adapted to fit between the ears 7 of an adjoining link, and a pivot element 11 is engaged in the openings 10 and 8, the resulting structure being a chain of the sort shown in Figures 3 and 4. The heads 4 of adjoining links abut as shown at 12, and therefore, the chain cannot sag. The teeth of the sprocket wheel are received in the recesses 6, between the extremities 14 of the bodies 2 of adjoining links, and movement is imparted to the sprocket chain, from the sprocket wheel, without the wear and tear which occurs when the tooth of a sprocket wheel engages within the opening in a sprocket chain of ordinary construction. The recesses 6 in the sides of the link 1 prevent relative lateral movement between the chain and the sprocket wheel.

In Figures 9, 10 and 11, parts hereinbefore described have been designated by numerals previously used with the suffix a. The modification consists in fashioning the heads 4ª of the links of angular form, rather than of circular form, as shown in Figure 3.

If the chain be employed in marine propulsion, any desired number of chains, located side by side, are mounted on sprocket wheels 15 carried by shafts 16 journaled in bearings 17 on a boat 18, one of the shafts 16 having cranks 19 connected by pitmans 20 with the cranks 21 (Figure 1) of an engine 22 on the boat. Rods 23 or like supports are mounted in the openings 5 that are formed in the heads 4 of the links 1, the rods 23 connecting the several chains, in a way which will be understood readily from Figure 8. Hangers 24 are mounted to swing on one of the rods 23 and are secured to paddles 25 provided with cross pieces 26 sustained by braces 27, the cross pieces 26 resting on adjoining rods 23 and steadying the paddles whilst they are in working position, the paddles feathering as they pass around the outermost sprocket wheels 15.

What is claimed is:—

1. A sprocket chain comprising links, each having a body provided at one end with a reduced neck having an enlarged head, the body being provided at its other end with oppositely disposed recesses, the link being supplied intermediate its ends with oppositely extended projections having pivot openings, the projections of adjoining links being overlapped upon each other to bring the openings into registration, and pivot elements in the openings, the head of one link being in abutment at its edge with the head of an adjoining link.

2. In a device of the class described, a plurality of sprocket chains located side by side, each sprocket chain being made up of links, and each link comprising a body provided at one end with a reduced neck having an enlarged head, the head being supplied with an aperture, the body being provided at its other end with oppositely disposed recesses, the link being supplied intermediate its ends with oppositely extended projections having pivot openings, the projection of one link being overlapped on the projection of an adjoining link to bring the openings into registration, pivot elements mounted in the openings, and connections joining the chains, the connections being mounted in the apertures of the heads.

In testimony that I claim the foregoing as my own, I have hereto affixed my signature.

JOHN STEVENS ORR.